(12) United States Patent
Thompson

(10) Patent No.: US 10,924,898 B2
(45) Date of Patent: Feb. 16, 2021

(54) SYSTEMS AND METHODS FOR SPATIAL CONTENT CREATION/MANAGEMENT AND MUSIC SHARING ON A SOCIAL PLATFORM

(71) Applicant: Travis Thompson, Chesapeake, VA (US)

(72) Inventor: Travis Thompson, Chesapeake, VA (US)

( * ) Notice: Subject to any disclaimer, the term of this patent is extended or adjusted under 35 U.S.C. 154(b) by 0 days.

(21) Appl. No.: 16/031,495

(22) Filed: Jul. 10, 2018

(65) Prior Publication Data

US 2019/0020983 A1    Jan. 17, 2019

Related U.S. Application Data

(60) Provisional application No. 62/531,501, filed on Jul. 12, 2017.

(51) Int. Cl.
| | |
|---|---|
| *H04W 24/00* | (2009.01) |
| *H04W 4/18* | (2009.01) |
| *G06Q 50/00* | (2012.01) |
| *H04L 12/58* | (2006.01) |
| *H04W 4/021* | (2018.01) |
| *H04W 88/02* | (2009.01) |
| *H04M 1/725* | (2021.01) |

(52) U.S. Cl.
CPC ............ *H04W 4/185* (2013.01); *G06Q 50/01* (2013.01); *H04L 51/32* (2013.01); *H04W 4/021* (2013.01); *H04M 1/72519* (2013.01); *H04M 1/72522* (2013.01); *H04W 88/02* (2013.01)

(58) Field of Classification Search
CPC ..... H04W 4/185; H04W 4/021; H04W 4/028; G06Q 50/01; H04L 51/32; H04L 67/18; H04L 67/306
USPC ........................... 455/456.1, 456.3; 709/204
See application file for complete search history.

(56) References Cited

U.S. PATENT DOCUMENTS

| | | | |
|---|---|---|---|
| 10,257,291 B1 * | 4/2019 | Matiash | ................... H04L 67/18 |
| 2009/0198728 A1 * | 8/2009 | Davia | ................... G06Q 10/109 |
| 2010/0125867 A1 * | 5/2010 | Sofos | ..................... H04N 7/165 725/28 |
| 2013/0346526 A1 * | 12/2013 | Rawat | ................... G06F 16/955 709/206 |
| 2014/0278860 A1 * | 9/2014 | Lee | ..................... G06Q 30/0214 705/14.16 |
| 2016/0014564 A1 * | 1/2016 | Del Vecchio | ............ G08G 1/20 455/456.2 |
| 2016/0307122 A1 * | 10/2016 | Cincotta | ................. G06Q 10/02 |
| 2018/0299162 A1 * | 10/2018 | Alberth, Jr. | ............... F24F 11/61 |
| 2018/0351895 A1 * | 12/2018 | Rathod | .................... H04L 51/10 |

* cited by examiner

*Primary Examiner* — Danh C Le

(57) ABSTRACT

A social network that enables mobile device users to store content associated with a geolocation. Users can interface using content associated with a geolocation. Users may listen to the same song and/or playlist together in real-time by selecting a user on a map that may be associated with geolocation information that may be available for the user. Users may create spatial events in which they can invite users based on one or more parameters, such as group or geographic locations. Users can then create a spatial buffer based on factors including time stamp and distance. Once a time stamp becomes current, invited users who enter within the proximity of the defined geofence may share content.

7 Claims, 20 Drawing Sheets

SYSTEMS AND METHODS FOR SPATIAL CONTENT CREATION/MANAGEMENT AND MUSIC SHARING ON A SOCIAL PLATFORM

CROSS REFERENCE TO RELATED APPLICATIONS

This non-provisional patent application is related to U.S. provisional patent application No. 62/531,501 filed with the United States Patent & Trademark Office on Jul. 12, 2017 and incorporates all content therein.

FIELD OF THE DISCLOSURE

The present disclosure generally relates to content creation/management, and more particularly to spatial creation/management and content sharing on social platforms.

BACKGROUND

Current challenges facing social media networks include limitations of user engagement spatially. Geographic locations of users and others provides many points for data utilization such as context, event coordination, socioeconomic standing, and social status. Some previous implementations employ linear feeds which effectively limit user ability to "look back" on memories.

Mainstream social media also forces users into more online interaction, which drastically erodes the core of human socialization. Social media also has a direct correlation between depression and inactivity in the population. Traditional social media has peaked; studies show that it has a counter intuitive effect on long term happiness. Mainstream social media increases one's long-term depression and negative thoughts. There is a market need for social media entities that encourage positive interaction.

SUMMARY

Systems and methods described herein provide a spatial platform enabling mobile device users to associate experiences and accompanying electronic content they gather with the geographic locations of those experiences. User-generated content such as videos, posts, pictures, stats, etc. may be organized via treks, geocached locations, and/or events. A spatial timeline may organize content of a user to allow for easier and more efficient social engagement, thereby stimulating and encouraging positive communications. Users may be grouped spatially based on similar interests and showcase their stories in a geographic journal. They also may create events and invite friends/fans based on set buffer distances. Maps, content and overlays of multiple users may be formed to assess social activities across a spatial platform. Having rigid spatial integrity may make it difficult—if not impossible—for users to be dishonest in recording a trek or event. A platform according to embodiments of the present disclosure also may address the problem of linear or tabular content that may be quickly lost through current confines of social media.

The spatial platform and accompanying methods further enables users to share and enjoy content including music together in real-time. Music may automatically play for users within a musical geofence or using a musical geofilter. Users may share music in real-time with family, friends, and followers, and celebrity users may share music with fans. A number of additional users who listen to an initial user's music may be tallied and provided to the initial user.

BRIEF DESCRIPTION OF THE DRAWINGS

For a more complete understanding of this disclosure, reference is now made to the following description, taken in conjunction with the accompanying drawings, in which.

DETAILED DESCRIPTION

Consumer spending patterns for non-essential goods and services are currently shifting away from the purchase of goods to more of a focus on real-life experiences. Rather than purchase unnecessary goods and services, consumers may rather use disposable income for travel. Systems and methods described herein provide platforms for users to highlight their active experiences, as well as encourage more recreational experiences, whether the experiences include going out to a restaurant or traveling to a new destination. Meaningful experiences may result in positive impact than acquisition of object and may make users feel more connected with other people and the larger community.

Figure 1:
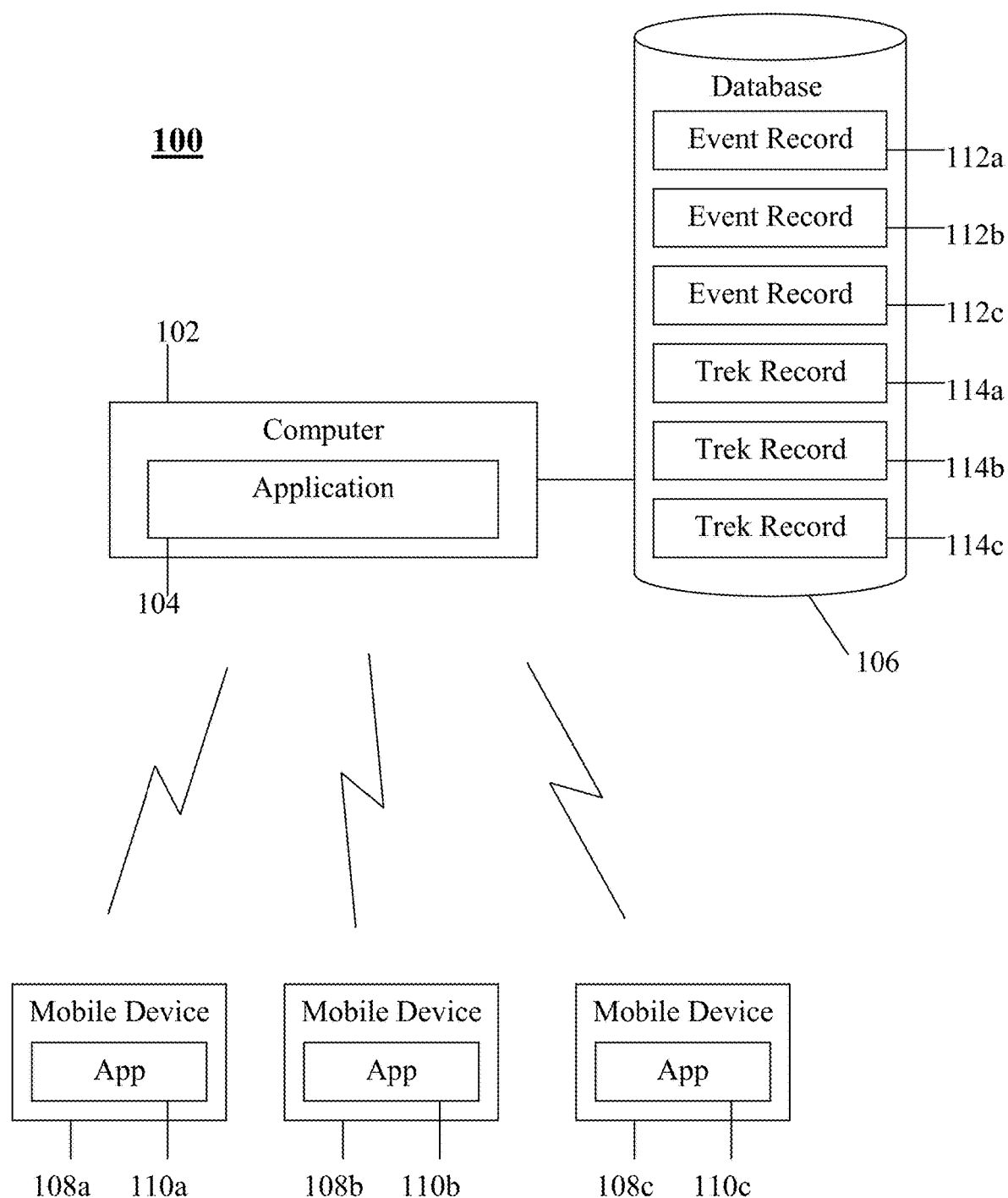
FIG. 1 is a block diagram of a system of spatial content creation/management and music sharing on a social platform.

Turning to the figures, FIG. 1 is a block diagram of a system of spatial content creation/management and music sharing on a social platform. FIG. 1 depicts components and interactions of a system 100. The system 100 comprises a computer 102, an application 104, a database 106, mobile devices 108a-c, and apps 110a-c. The system 100 also comprises event records 112a-c and trek records 114a-c. In embodiments, the system 100 comprises more or less than quantity three each of mobile devices 108a-c, apps 110a-c, event records 112a-c and trek records 114a-c.

In an embodiment, the computer 102 comprises more than one physical computer that may be situated at more than one geographical location. The application 104 executes on the computer 102 and provides much of the functionality of the present disclosure. In an embodiment, the application 104 executes on more than one computer 102.

The database 106 is associated with the computer and stores data associated with the operations of the application 104 and other components of the system 100. In an embodiment, more than one database 106 is in use by the system 100. A database management system (not depicted in FIG. 1) may manage operations of the database 106 based at least on instructions received from the application 104.

The mobile devices 108a-c submit messages and electronic to the computer 102 as described herein. The mobile devices 108a-c receive messages and electronic from the computer 102 as described herein. The mobile devices 108a-c exchange messages with each other under some circumstances. The apps 110a-c execute on the mobile devices 108a-c, respectively, and provide some of the functionality described herein.

The presence of the apps 110a-c actively executing may in embodiments be essential to the systems and methods provided herein to function as described. The apps 110a-c communicate with the application 104 to register participation by the hosting mobile devices 108a-c in geofence activities as described herein. In embodiments, the mobile devices 108a-c must be pre-registered with the application 104 and their information stored by the application 104 in order for the mobile devices 108a-c to participate in geofence activities.

The event records 112a-c are stored in the database 106 and store information about ongoing and past events as described herein. For each event, a particular event record 112a-c describes the geofence used, the date and time period of the event, participating mobile devices 108a-c and their roles, and electronic content generated and shared during and after the event.

Similarly, trek records 114a-c are stored in the database 106 and store information about ongoing and past treks as described herein. For each trek, a particular trek record 114a-c describes the geofence used, the date and time period of the trek, participating mobile devices 108a-c and their roles, and electronic content generated and shared during and after the trek.

Figure 2:
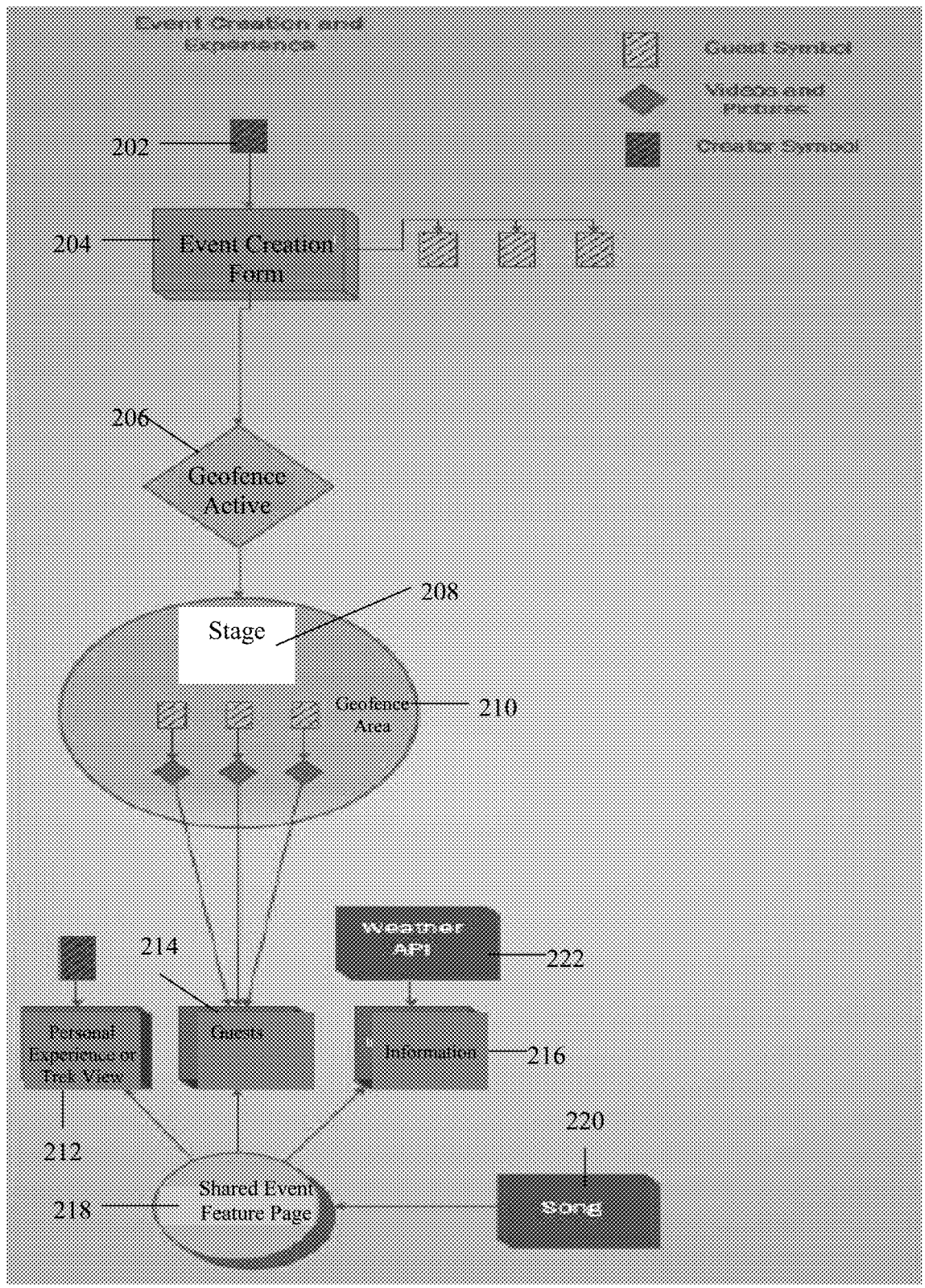
FIG. 2 is a flow diagram of event creation and experience according to an embodiment of the present disclosure.

FIG. 2 depicts event creation and experience 200 according to an embodiment of the present disclosure. An event may be created using an event creation form. One or more users may associate themselves or otherwise be associated with the event. An active geofence may be established in connection with the event. At or around the time of the event, the geofence may become active. In an embodiment of the present disclosure, as depicted in FIG. 2, the active geofence may be established around the stage at a concert. As users associated with the event enter the active geofence, the users may take photos and/or videos and upload them in connection with the event. As photos and/or videos are connected with the event using systems and methods according to embodiments of the present disclosure, other users associated with the event may view the photos and/or videos in real-time. Users also may view these photos and/or videos after the event. In some embodiments of the present disclosure, a weather API may be connected in with the event so that users may recall the weather conditions after the event. There also may be a shared event feature that may permit users to share the event with other users. In some embodiments of the present disclosure, a music API may be connected in with the event and/or geolocation so that users may recall a song(s) played after the event. Users may listen to the same song(s) together in real-time and may share a musical experience on a shared event feature page. The shared event feature page may provide a personal experience or trek view, information about the trek and/or musical experience, and/or guest information.

FIG. 2 depicts a process flow 200 of an event creation and experience according to an embodiment of the present disclosure. A creator symbol 202 represents the person using mobile device 108a-c that initiates the event by submitting an event creation form 204. At decision point 206, if the geofence is active, the event may begin. The stage 208 is used by performers at a concert attended by users or mobile devices 108a-c provided by the system 100. The geofence area 210 surrounds the stage 208 and is the physical area in which mobile devices 108a-c must remain to participate in the functionality of the application 104 and other components provided herein. While a concert is used as an example, the event may be any other gathering, for example a political, social, religious event, or any other cultural event, for example a ballet or opera.

Guests 214 may be users of the mobile devices 108a-c. Personal experience or trek view 212 (in the case of treks described in connection with FIG. 3) are contributed, for example song 220, which may be shown on a shared event feature page 218. Information 216 may be made available by the shared event feature page 218. A weather api 222 may be accessed to determine what the weather was at the time of the event.

Figure 3:
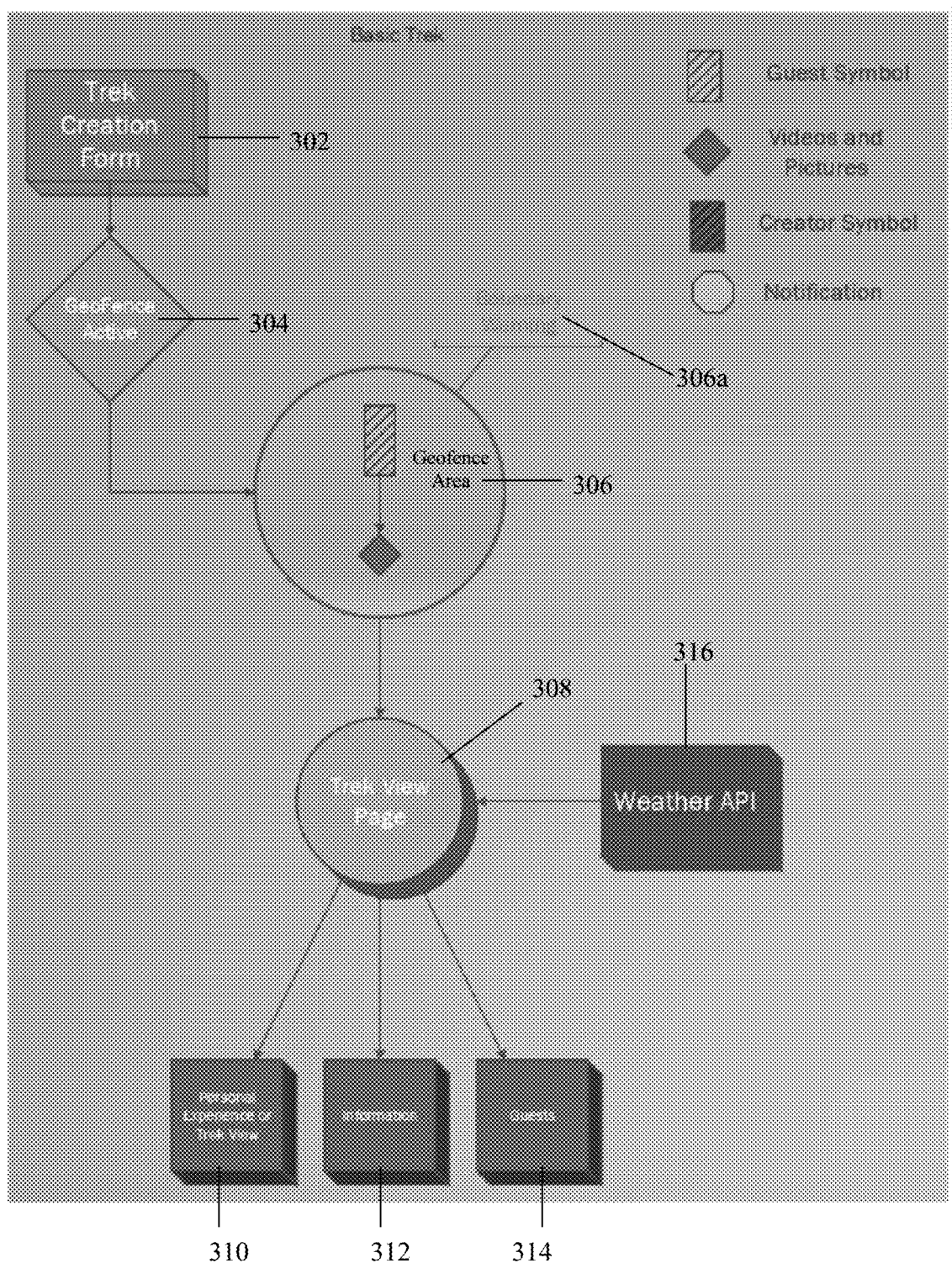
FIG. 3 is a flow diagram of a basic trek according to an embodiment of the present disclosure.

FIG. 3 depicts a basic trek 300 according to an embodiment of the present disclosure. A trek may be created using a trek creation form 302. The trek creation form 302 may include defining an active geofence. Once a determination is made of geofence active 304, the user of the mobile device 108a provided by the system 300 may enter the geofence area 306. The user may capture electronic material such as images or audio content. The user may request that the captured electronic material be associated with the trek that has been created. The active geofence may include a boundary warning so that the user may be notified if he/she may be about to exit the active geofence. When the user exits the active geofence, the trek may be ended. The user may view his/her trek on a trek view page 308, either during or after the trek in embodiments. The trek view page 308 may be viewed through the app 110a, and the user may share the trek view page 308 with others. The trek view page 308 provides a personal experience or trek view, information about the trek, and/or guest information. A weather API 316 may be associated with the trek so that the user may associate weather conditions with a trek.

Figure 4:
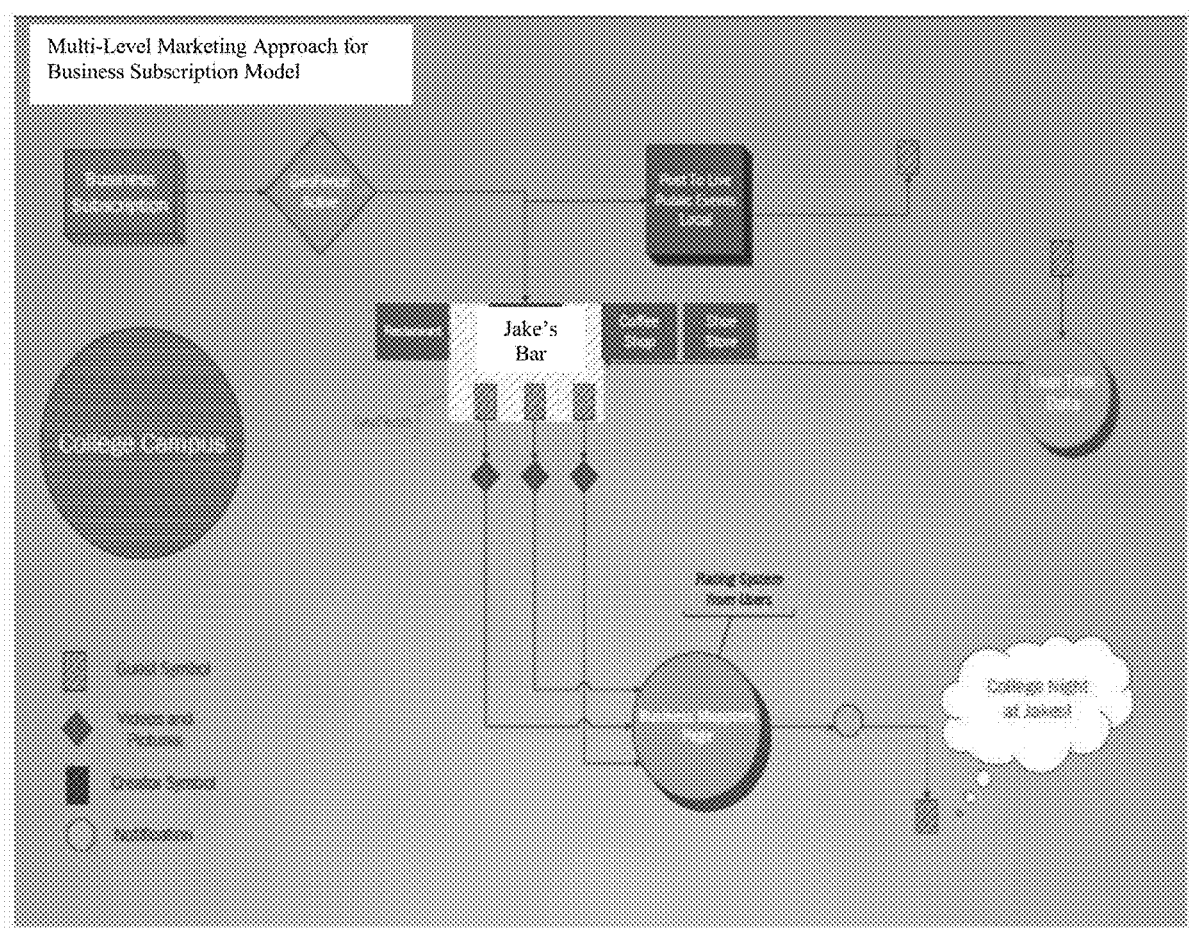
FIG. 4 is a flow diagram of a business subscription model according to an embodiment of the present disclosure.

FIG. 4 is a flow diagram of a business subscription model in accordance with an embodiment of the present disclosure. A business subscription model 400 is depicted in which active geofences are provided to storefronts and other establishments. The business subscription model 400 provides geographic planning tools to businesses, business mobile and desktop accounts (that may include a native rating system and user-driven content), access to public event posts, and/or the ability to target local trekkers (users) who may match with their business profiles. FIG. 4 depicts the business subscription model 400 in which users may be on a college campus. Businesses located near the college campus may subscribe to the platform so that students and other users may be made aware of promotions associated with the businesses when users enter an active geofence associated with the businesses.

Figure 5:
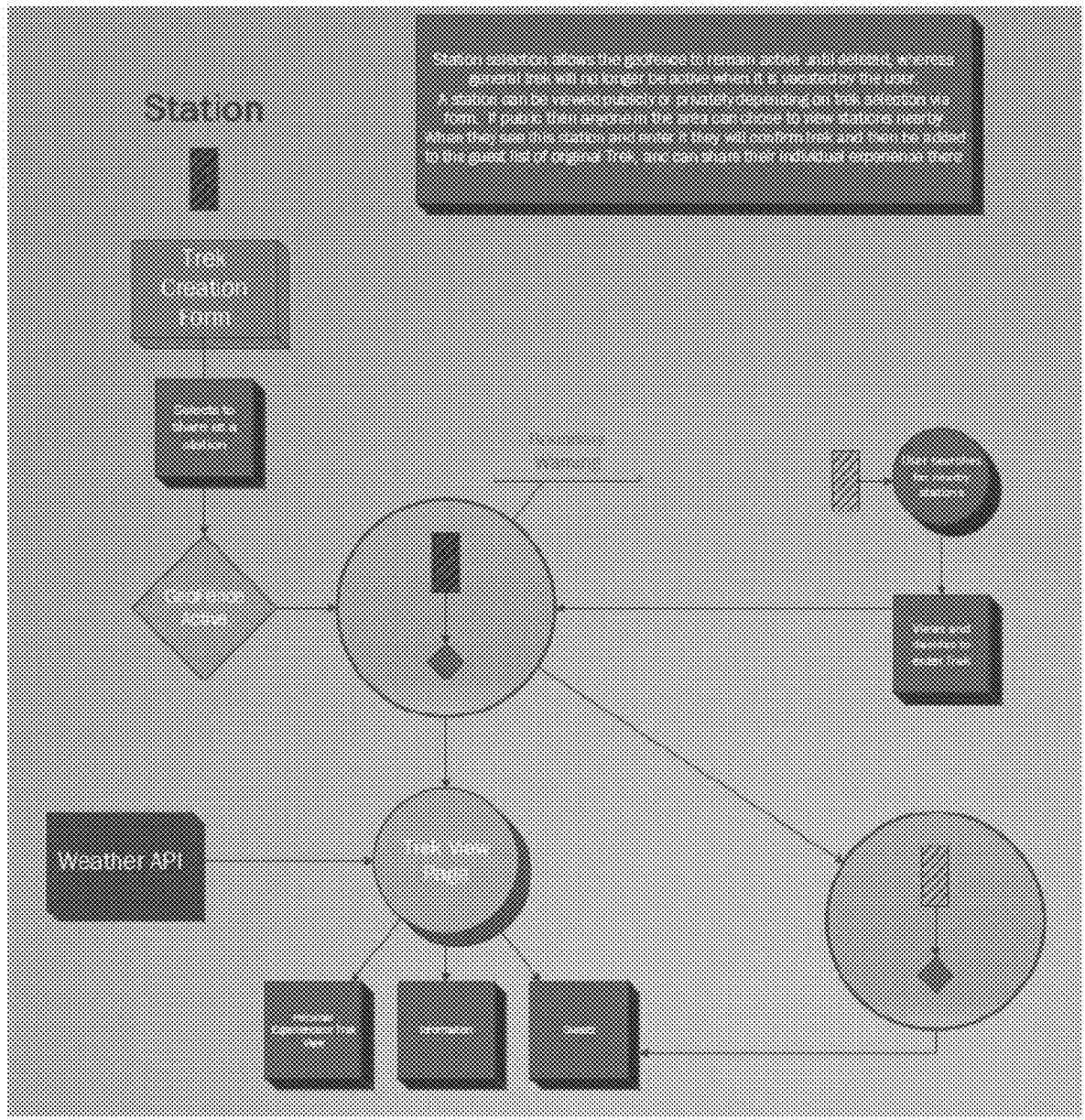
FIG. 5 is a flow diagram of station selection according to an embodiment of the present disclosure.

FIG. 5 depicts station selection according to an embodiment of the present disclosure. Whereas in a general trek a geofence may no longer be active when vacated by a user, station selection allows a geofence to remain active until explicitly deleted. A station may be viewed publicly or privately and may depend upon trek selection by use of a form. If a station is viewed publicly, any user within a certain area may choose to view stations nearby. If a user views a station and enters the station into a form, the user may confirm a trek, and the user may be added to the guest list of an original trek. Users may share individual experiences in the guest list of the original trek.

The present disclosure also provides for challenge creation that allows users to challenge one another and compete using geofences. A user who has received a challenge may accept or deny a challenge. If the user accepts the challenge, a trek may be created using a trek creation form. The form includes selection of a route feature and/or selection of a point feature which may define an active geofence. Selecting a route feature may provide selecting a mode of transportation that may include biking, walking, running, boating, using mass transportation and/or driving. One user may challenge another user to complete a trek by entering a geofence or by completing a given route. After a challenge is accepted, the challenge may be added to a challenge ribbon and may in appear in a challenge queue for competing users to view on a trek view page.

Figure 6A:
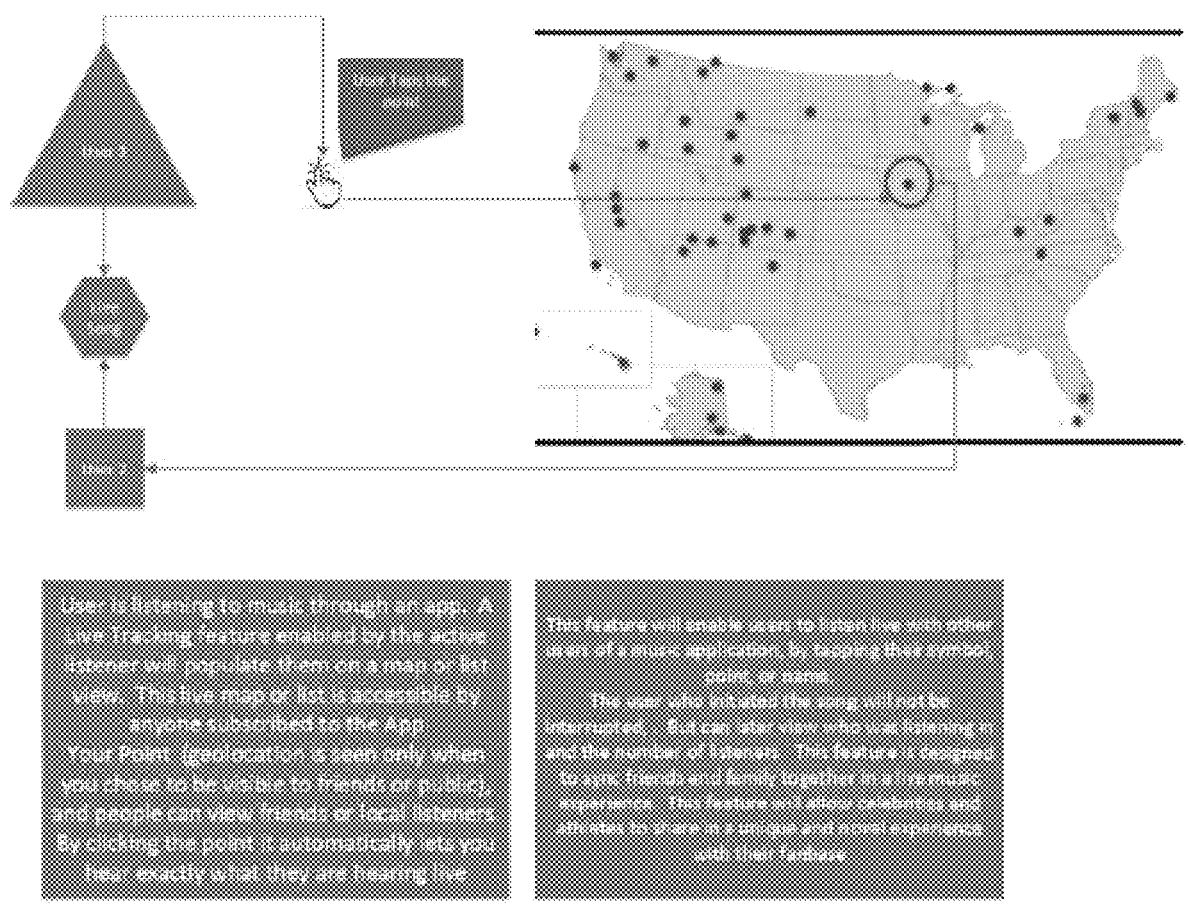
FIGS. 6A-6F depict music sharing in real-time according to an embodiment of the present disclosure.

FIGS. 6A through 6F depict music sharing according to an embodiment of the present disclosure. Users may listen to music using a spatial content creation/management system on a social platform in a music application as described and depicted herein. FIG. 6A depicts a first user listening to music who may be tracked using geofences, and a second user who may select the point, location, symbol or name in which the first user is located. The second user may wish to simultaneously listen to the same song as the first user in real-time. The first user is not interrupted from listening to music or any other activity when another user listens to the same music.

The first user may view how many listeners or followers joined the first user. Friends and family members in the role of first user may grant permission to others in the role of second user who may wish to listen to the same song as the first user. In embodiments, public figures including celebrities, athletes, and politicians may function in the role of first user and provide access to others who wish to assume the role of second user and enjoy the same music or other content presently enjoyed by public figure in the role of first user.

Figure 6B:
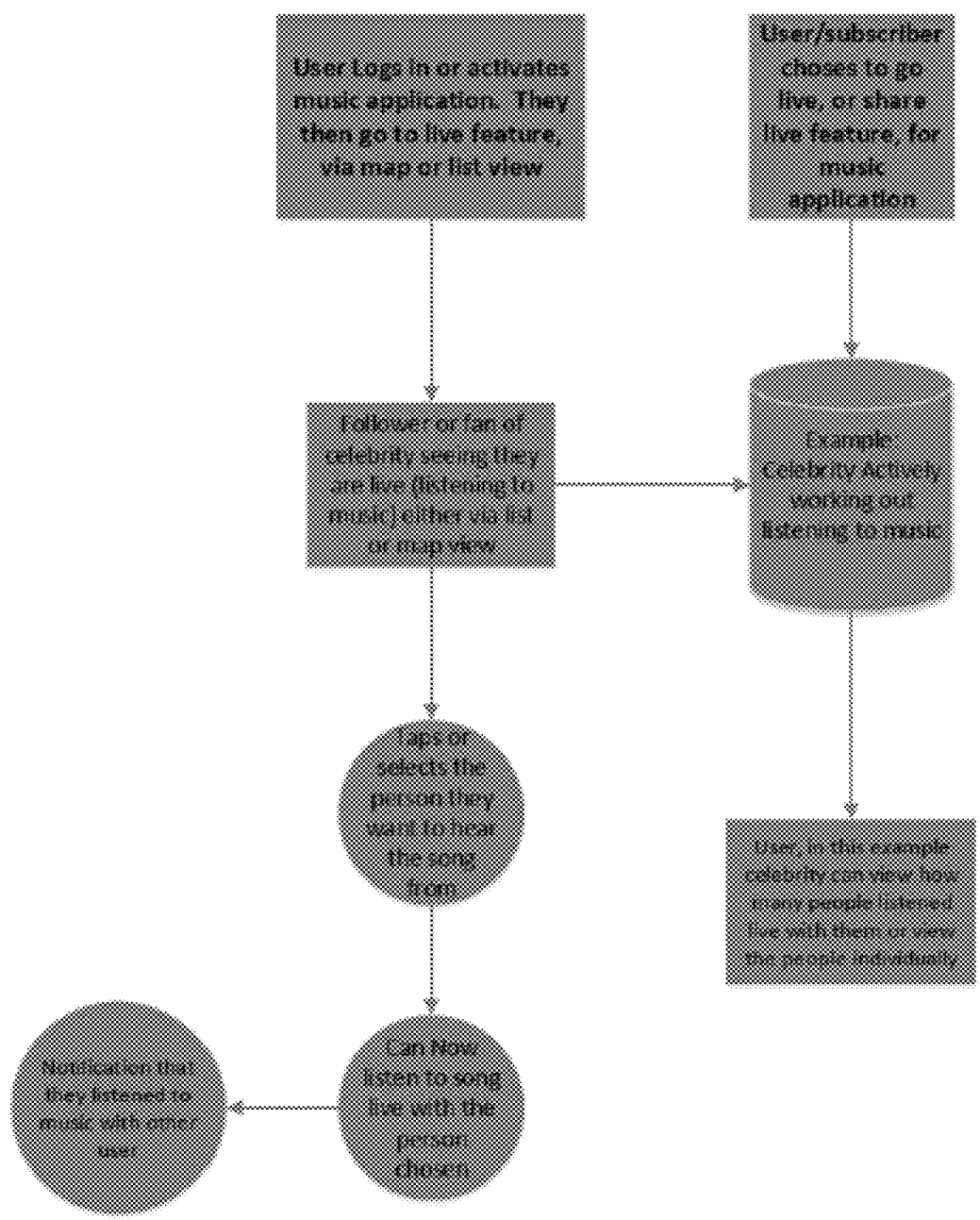

FIG. 6B depicts a method of sharing music with other users in real-time. A user of the mobile device 108a-c in the role of first user described above activates a music application that offers a live feature on a map or in a list view. The music application may execute partially or completely on the mobile device 108a-c and may be the app 110a-c. A family member or friend or a fan or follower in the instance when the first user is a public figure selects the first user on the map or from the list view. They may then concurrently listen to song or other electronic content that the first user is presently enjoying. The first user may receive a notification that the follower, fan, or other second user has effectively joined and is now presently to the content that the first user has been enjoying. For example, a celebrity may listen to certain music during a workout session and may allow that the music may be listened to by others. Fans of the celebrity will note or may receive notifications that the celebrity is now effectively "on line", i.e. that the celebrity is listening to content that is available for listening by fans of the celebrity. Fans may then activate their mobile devices 108a-c to listen to that same content presently enjoyed by the celebrity.

Figure 6C:
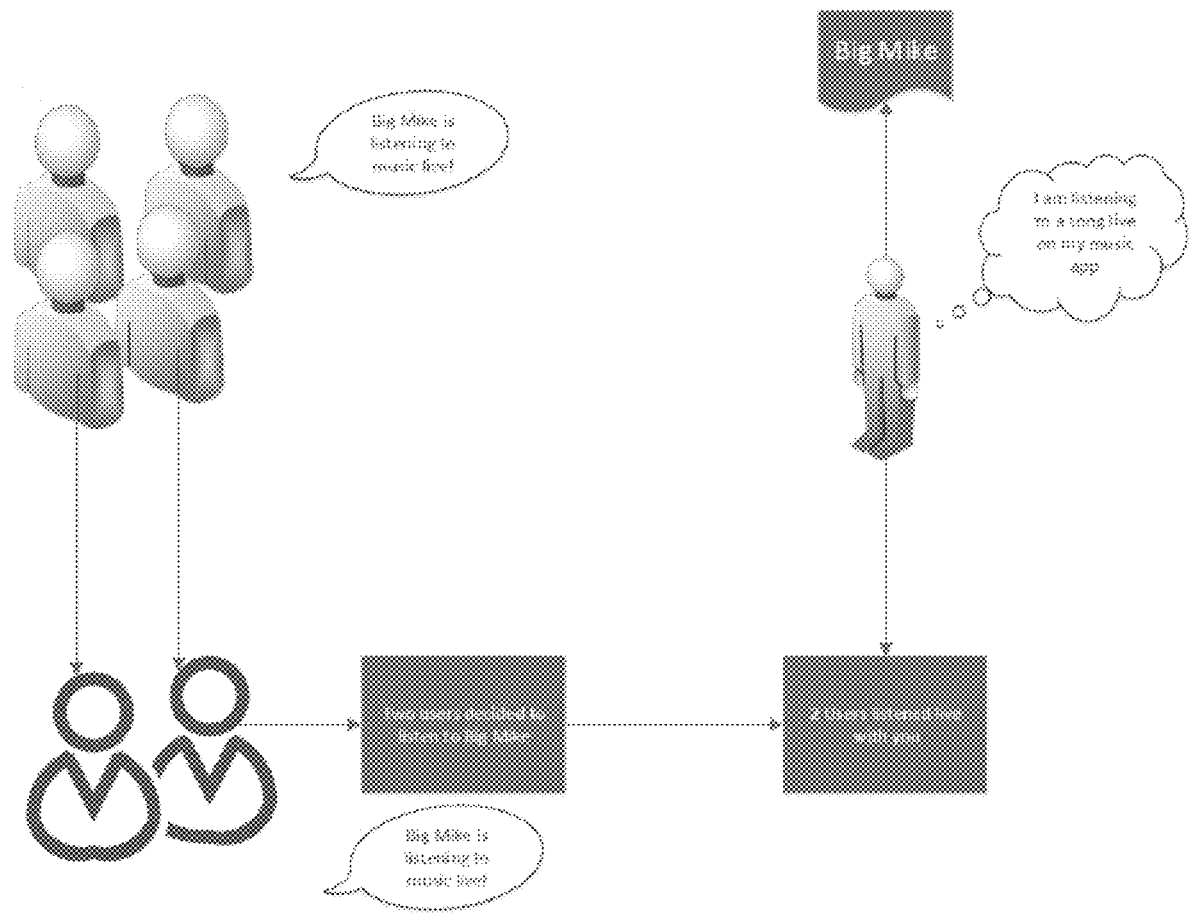

FIG. 6C depicts an exemplary process of a party in the function of first user sharing music live with two other parties in the roles of second users. The first user has the name "Big Mike" in this example. Fans or followers of Big Mike learn that Big Mike is presently listening to certain content. The fans or followers are provided access by the teachings herein to concurrently listen to the certain content presently being enjoyed by the party with the name Big Mike.

Figure 6D:
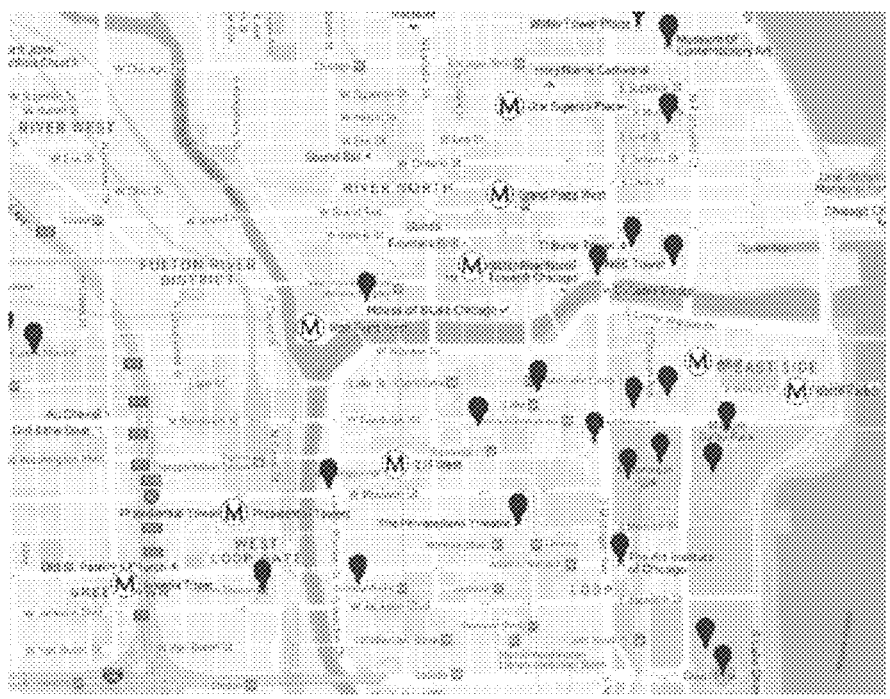

FIG. 6D depicts waypoints representing active music application users or listeners who may publicly share their music. A new user may select a waypoint to listen to the publicly shared music. Selection of a waypoint representing a user listening to music does not share that user's personal information. But such selection does allow other users to listen to the same song simultaneously and in real-time as the user they have selected by choice of a waypoint.

Waypoints on the map shown in FIG. 6D represent listeners using mobile devices 108a-c who have chosen to share publicly the content they are presently enjoying. By selecting a listener of interest, another listener can enjoy the content presently enjoyed by the party represented by the waypoint. Personal information of both the listener of interest and the party that has selected the waypoint representing the listener of interest may not be shared unless authorization is provided.

Figure 6E:
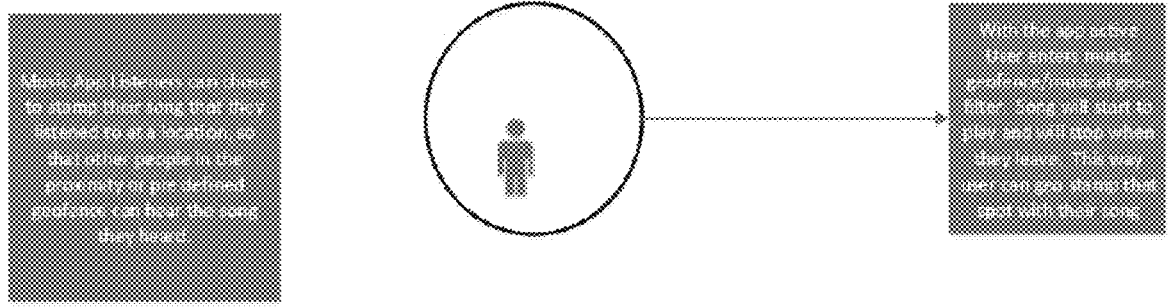

FIG. 6E depicts a first user who may choose to stamp or connect a song to a location. Other users located within a certain proximity or a predefined geofence of the user listening to the song may hear the song upon the first user entering a preconfigured musical geofence or musical geofilter. The first user's song geo-stamped or connected to a location may play upon that first user entering the geofence and stop when that first user exits the geofence.

Figure 6F:
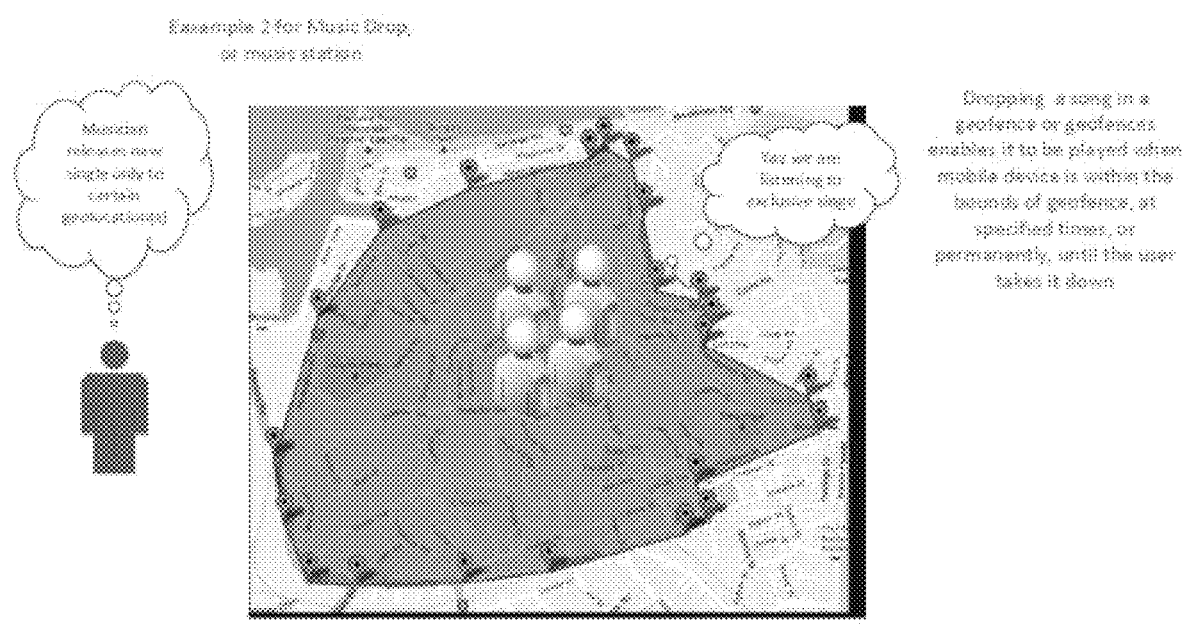

FIG. 6F depicts an exemplary music sharing application in which music is shared with a specific geolocation. A song may be provided in a geofence(s) and may only play for users located within the bounds of the geofence(s), as depicted in FIG. 6F. It should be appreciated that music may be shared at specific times or permanently until the user disables the song from playing.

Figure 7A:
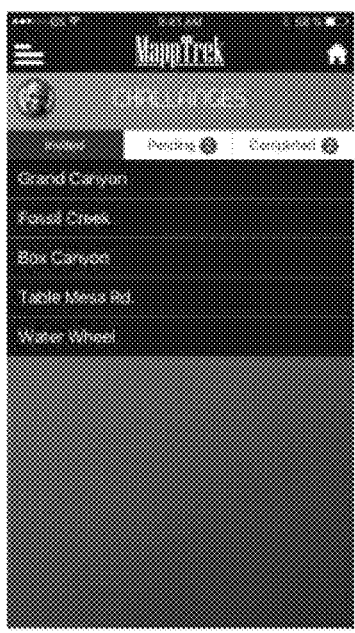
FIGS. 7A-7C depict screenshots related to a challenge according to an embodiment of the present disclosure.
Figure 7B:
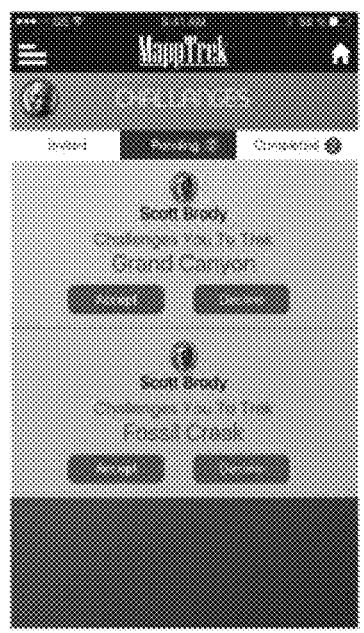
Figure 7C:
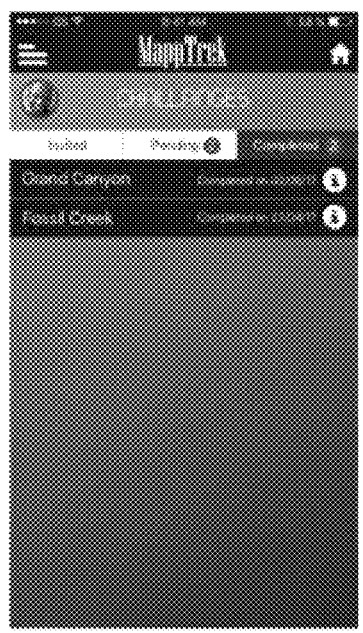

FIGS. 7A-7C depict screenshots related to a challenge according to an embodiment of the present disclosure. FIG. 7A depicts a challenge menu, in which a user may be invited to complete a challenge. Challenges may be listed by location in some embodiments of the present disclosure. A user may provide a title for the challenge he/she has created.

FIG. 7B depicts a challenge menu in which a user may have pending challenges that have been presented to that user by other users. The subject user may be provided with an option to accept or decline a particular challenge. Identities of users that has created and extended challenges may be displayed, as depicted in FIG. 7B. In embodiments, such identities may not be displayed or may be displayed under certain circumstances.

FIG. 7C depicts a challenge menu in which a user's completed challenges may be displayed. Completed challenges may be listed by location and/or title and may include a completion date, as depicted in FIG. 7C, as well as other information.

Figure 8A:
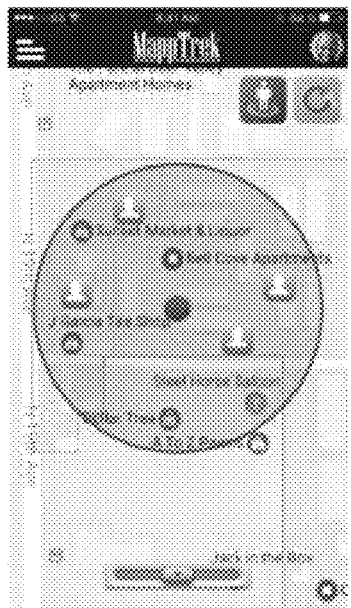
FIGS. 8A-8F depict screenshots related to an event according to an embodiment of the present disclosure.
Figure 8B:
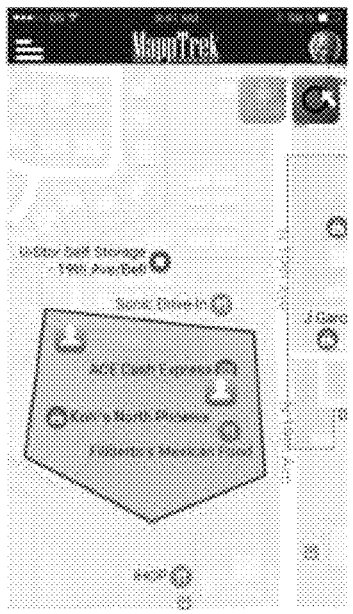

FIGS. 8A-8E depict screenshots related to an event according to an embodiment of the present disclosure. FIG. 8A depicts a full screen view of a map associated with an event. FIG. 8B depicts another full screen view of a map associated with an event.

Figure 8C:
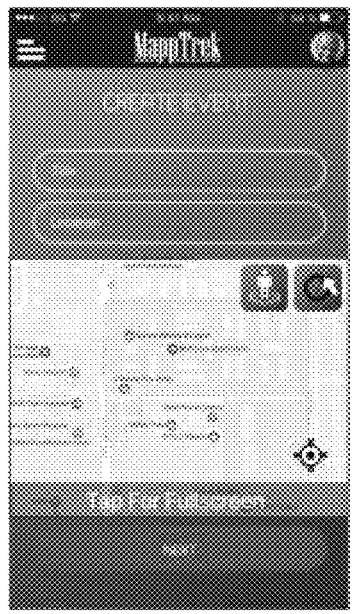

FIG. 8C depicts event creation, wherein a user may enter one or more items of information about an event including, for example, title, category selection, and location. Addresses may be entered for such locations in some embodiments. A user may pin a location on a map that may be provided within the platform as depicted in FIG. 8C.

Figure 8D:
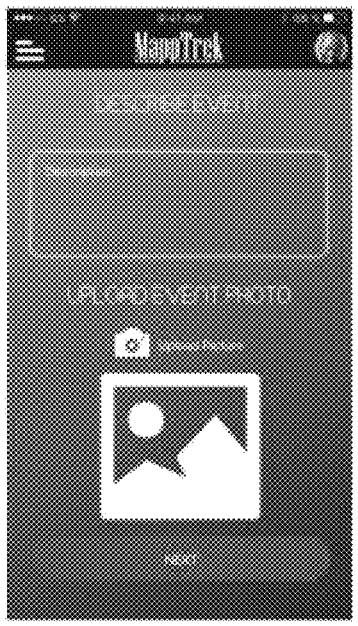
Figure 8E:
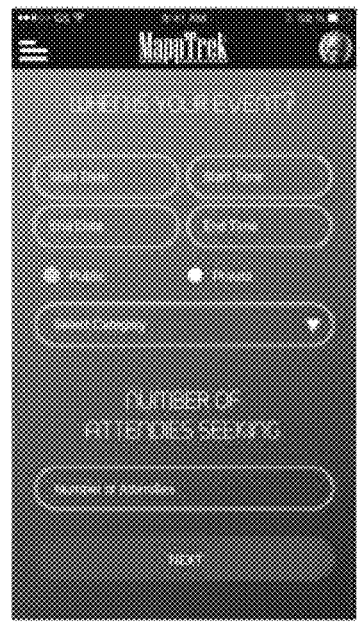

FIG. 8D depicts a screenshot associated with an event in which a user may describe the event and upload one or more photos related to the event. FIG. 8E depicts an event creation screen, wherein a user may enter a start date, end date, start time, and end time.

Figure 8F:
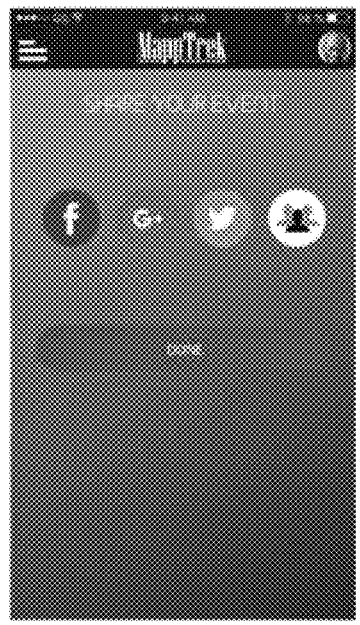

The user may select whether the event is public or private and may select a category and number of attendees associated with an event. FIG. 8F depicts a screenshot associated with sharing an event via social media outlets and/or directly with contacts.

Figure 9A:
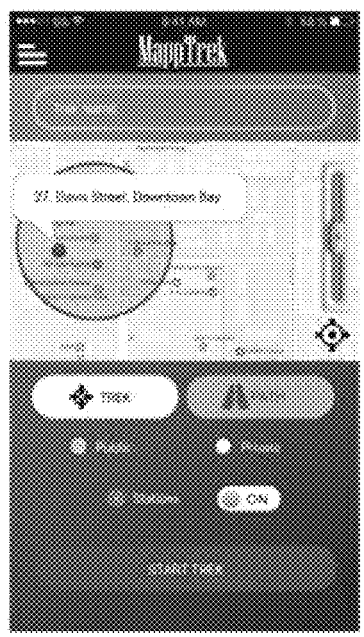
FIGS. 9A-9C depict screenshots related to a trek according to an embodiment of the present disclosure.
Figure 9B:
Figure 9C:
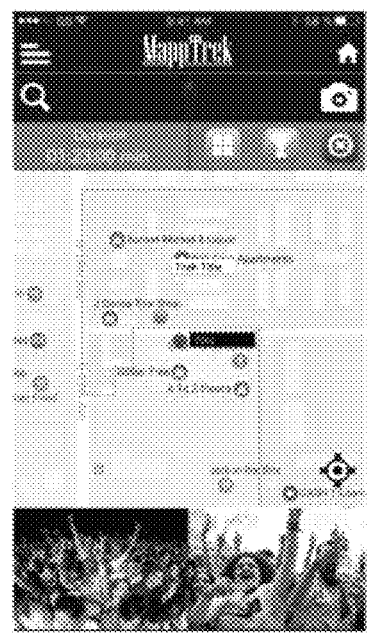

FIGS. 9A-9C depict screenshots related to a trek according to an embodiment of the present disclosure. As depicted in FIG. 9A, a path may be defined by a starting point and end point. The starting and end points may be depicted on a map and/or with addresses. The user may be presented with input mechanisms to start a trek and/or delete a trek as depicted in FIGS. 9A-9C. A user may select a path as depicted in FIG. 9B, and this may be the location(s) where the user desires to start and end a trek. As depicted in FIG. 9C, an active trek may provide a duration or timer for the trek, photographs, and a location indicator that may be provided in real-time or afterward.

Figure 10A:
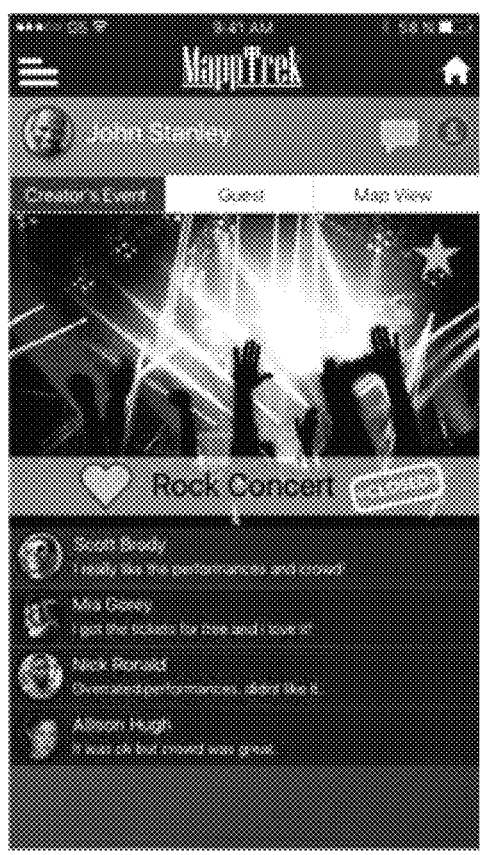
FIGS. 10A and 10B depict screenshots related to a trek event view according to an embodiment of the present disclosure.
Figure 10B:

FIGS. 10A and 10B depict screenshots related to a trek that may be defined as an activity such as a concert, or as a location, such as a park. The user, as well as other users associated with that activity/location, may upload photos/videos and audio files and may add comments, as depicted in FIGS. 10A and 10B. The trek may be viewed as an event view that may include guest comments, a map view, and/or guest list, as depicted in FIGS. 10A and 10B.

Figure 11A:
FIGS. 11A and 11B depict screenshots related to a according to an en explore page window embodiment of the present disclosure.
Figure 11B:
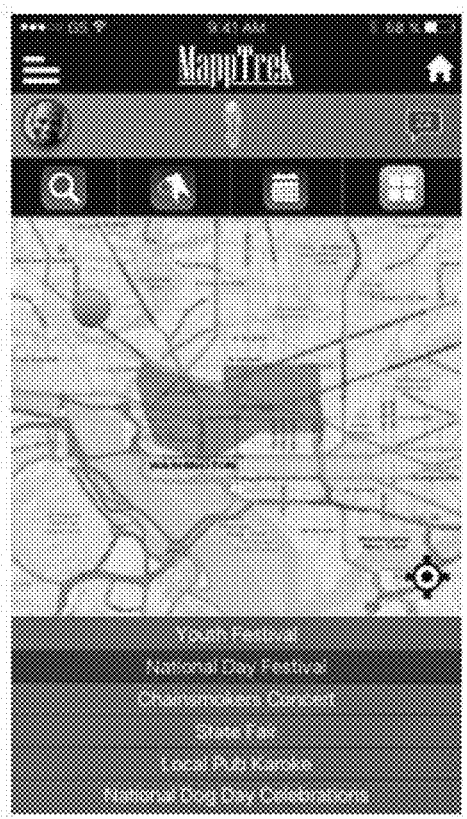

FIGS. 11A and 11B depict screenshots related to an explore page window of a trek according to an embodiment of the present disclosure. A user may select an event type for a local event that may include recreation, community, entertainment, volunteer, sales, dining, and health and wellness, as depicted in FIG. 11A. A user may select a specific event that may be provided in a category, as depicted in FIG. 11B. Users may view upcoming public events or upcoming events or stations (open treks) of friends per the explore page window. By making an appropriate selection, the users may view associated content and metadata.

Figure 12:
FIG. 12 depicts a screenshot related to a homepage view according to an embodiment of the present disclosure.

FIG. 12 depicts a screenshot related to a homepage of a user according to an embodiment of the present disclosure. The homepage may provide trending treks, local treks, and a friends menu. Trending treks may provide a date and time for an event, as depicted in FIG. 12. It should further be appreciated that users my select or like trending treks of interest, as depicted in FIG. 12.

Figure 13:
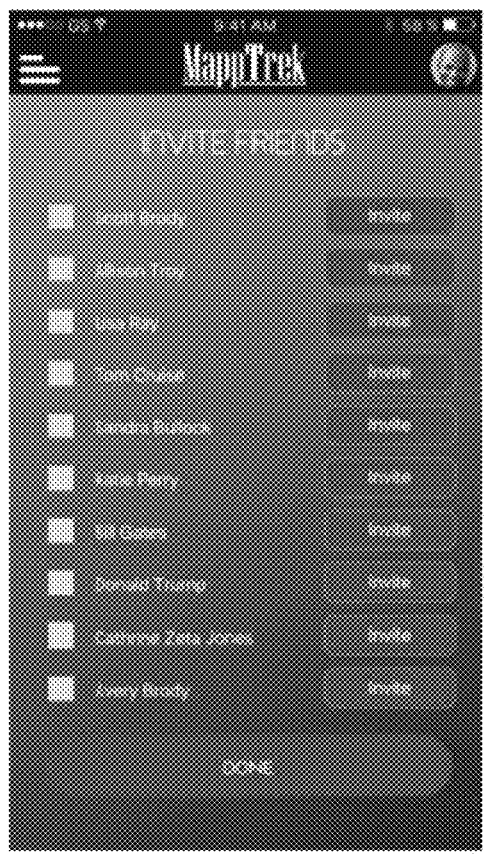
FIG. 13 depicts a screenshot related to inviting friends according to an embodiment of the present disclosure.

FIG. 13 depicts a screenshot related to inviting friends to connect. It should be appreciated that friends may be family, friends, public figures, or any other person or group. Friends may accept an invitation by selecting an "invite" button or other selectable object, as depicted in FIG. 13.

Figure 14A:
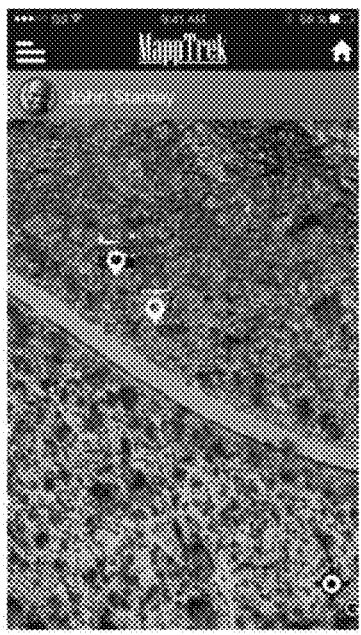
FIGS. 14A-14C depict screenshots related to tracking and displaying a journey according to an embodiment of the present disclosure.
Figure 14B:
Figure 14C:

FIGS. 14A-14C depict screenshots related to tracking and displaying a journey according to an embodiment of the present disclosure. Treks or journeys along a trek may be displayed on a map, wherein the map may provide an aerial view of the journey, as depicted in FIGS. 14A-14C.

A view of the journey may be magnified, as depicted in FIGS. 14A and 14B. A view of the journey may provide a legend or key in which users participating in the trek or en route along the trek may be indicated on the map, as depicted in FIG. 14C. It should be appreciated that the map may provide indicators for treks, events, routes, and/or stations, as depicted in FIG. 14C.

Figure 15A:
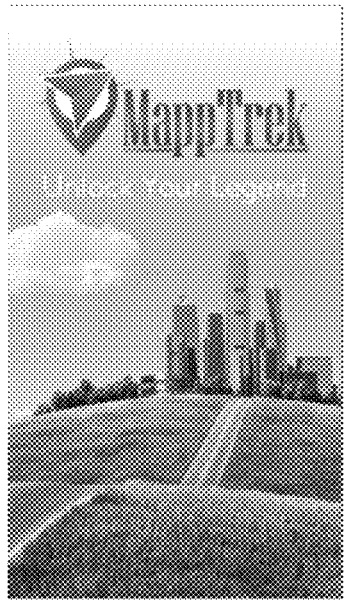
FIG. 15A-15E depict screenshots related to login pages and backend profile pages according to an embodiment of the present disclosure.
Figure 15B:
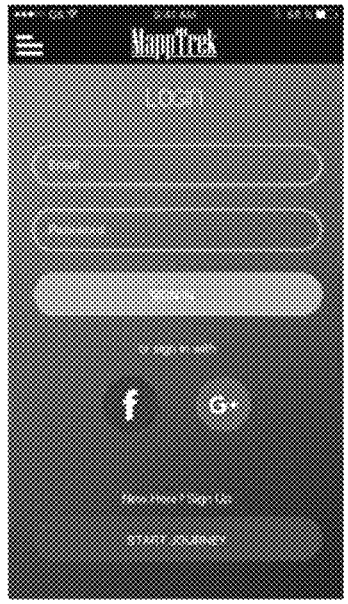
Figure 15C:
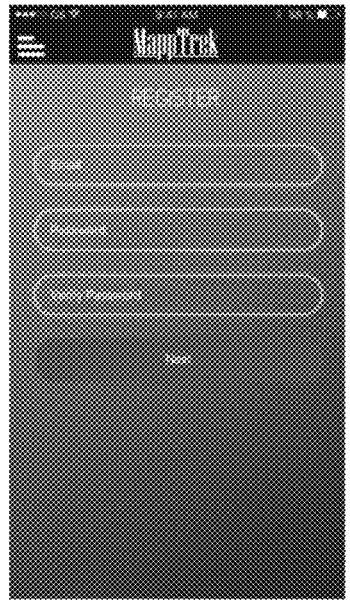
Figure 15D:
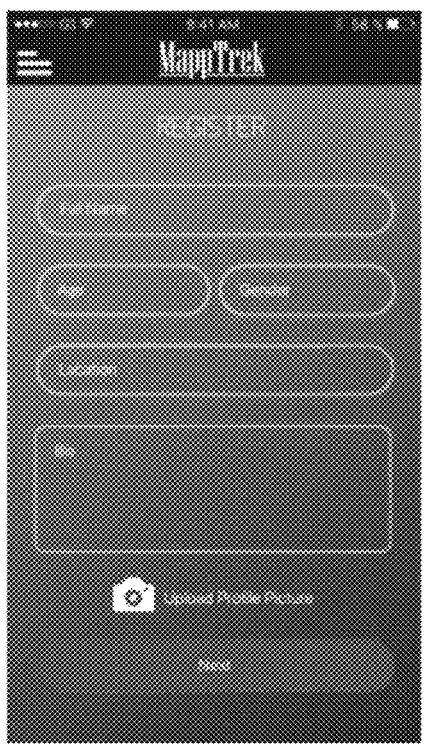
Figure 15E:
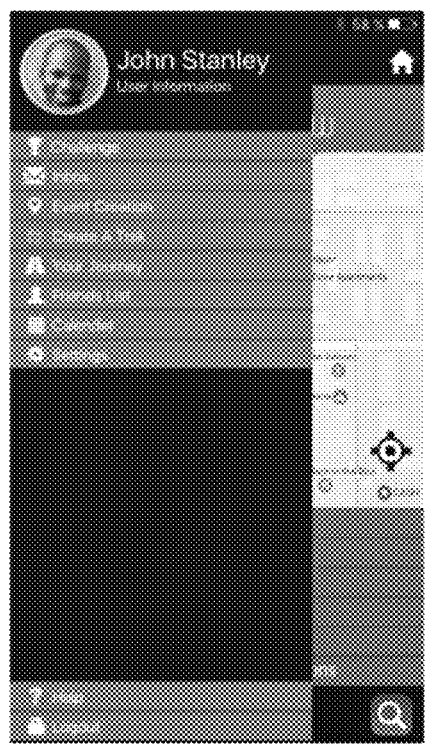

FIGS. 15A-15E depict screenshots related to login pages and backend profile pages according to an embodiment of the present disclosure. FIG. 15A depicts a screenshot of a landing page in which a logo and scenery may be displayed. FIG. 15B depicts a screenshot of a login page in which a user may input his/her email address and password. Alternatively, a user may login to the platform through his/her social media credentials, such as Facebook or Google Plus. FIG. 15C depicts a screenshot of a verification page in which a user may verify a password connect to an e-mail address or login. Upon validation of the user's email address and password or social media credentials, the user may be presented with a registration page as depicted in FIG. 15D. The user's registration page may include, but is not limited to, the user's name, age, gender, location, bio, and profile picture. Upon completing the registration page, a user's backend profile page may be displayed, as depicted in FIG. 15E, in which the user's information may include, but is not limited to, the user's profile photo, number of treks created, number of events attended, recent treks, events attended, notifications, bucket list, and/or bookmarks. More or fewer items may be displayed on the user's profile page.

Figure 16A:
FIGS. 16A-16C depict screenshots related to frontend profile pages and a messenger pages according to an embodiment of the present disclosure.
Figure 16B:
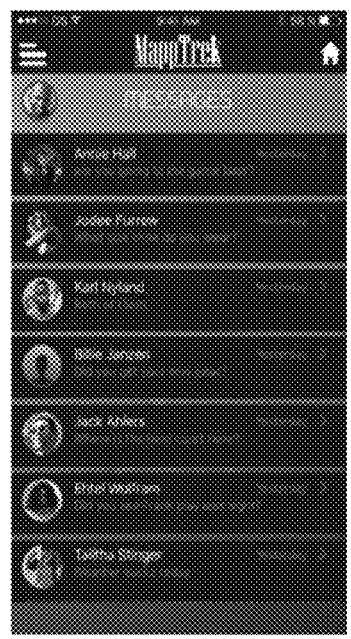
Figure 16C:

FIGS. 16A-16C depict screenshots related to a frontend profile page and messenger pages according to an embodiment of the present disclosure. FIG. 16A depicts a screenshot of a frontend profile page that may include, but is not limited to, a user's photo, name, the number of treks created, the number of events attended, a calendar, another other information. It should be appreciated that the frontend profile page may be provided as backend profile page.

FIG. 16B depicts a screenshot of a messenger page that may include messages from other users. FIG. 16C depicts a screenshot of a page that may provide a listing of stations, bookmarks, recent treks, and events that the user may plan to attend. It should be appreciated that the information provided by the page may include dates, times, and addresses, as depicted in FIG. 16C.

Figure 17A:
FIGS. 17A-17C depict screenshots related to viewing a trek according to an embodiment of the present disclosure.
Figure 17B:
Figure 17C:
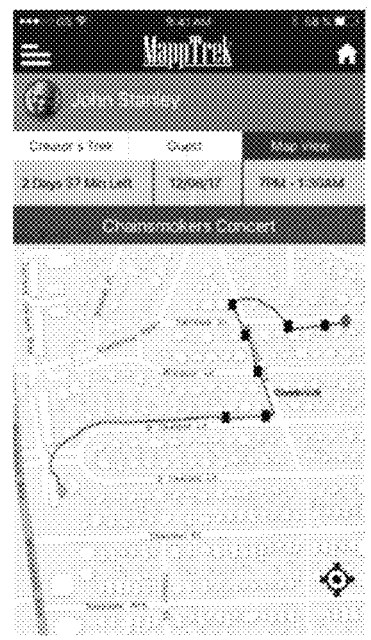

FIGS. 17A-17C depict screenshots related to viewing a trek according to an embodiment of the present disclosure. Viewing a trek may provide a creator's trek page, a guest page, and a map view page, as depicted in FIGS. 17A-17C. FIG. 17A depicts a trek event view popup that may provide the name of a trek, a rating, an option to forward to other users, a description of the trek, and comments that may be provided by other users. FIG. 17B depicts a guest list of users who may attend a trek. FIG. 17C depicts a map view that may provide a map of a trek. The map view may provide a time period that may remain before a trek may expire, a date, and a time, as depicted in FIG. 17C.

A user may effectively insert an item of electronic content into a geofence area such that users who travel into that area may then have access to that item of content. Those users may become aware of the new availability of that item of content by viewing a map, seeing a list, or receiving a message from the computer 102 provided by the system 100.

For example, a musician scheduled to give a concert at a specific future date at a particular concert venue may insert into a geofence surrounding that concert venue an availability for a new song within, for example, two weeks of the concert. Users of mobile devices 108a-c with app 110a-c activated may be able to listen to the new song when they travel into the geofence area. The new song may not be generally available outside the geofence area. This action may have the effect of increasing ticket sales for the concert and/or increasing sales of the song online or from music vendors.

An author engaging in a book tour may similarly make available portions of the book or unpublished but interesting material in geofence areas created for future destinations of the book tour. This action may result in greater attendance at future stops along the book tour and may increase sales of the book that is the subject of the book tour or of other publications by the author.

Embodiments of the present disclosure may integrate spatial integrity, engagement, and organization into a unique platform not provided by previous implementations. Users may be encouraged by the teachings herein to interact and experience new memories. Users can experience different "bucket lists" which may encourage them to integrate or create their own unique online identity. Through a database of active users, people can connect spatially for fun community-based activities. Advanced marketing and vendors may target potential customers based on spatial location. Vendors also may have access to customer preferences which may simplify preferential marketing. Public figures may use the platform according to embodiments of the present disclosure to highlight their career progression and activities.

The platform also provides outlets for engagement by public figures with fans, highlighting the public figures' statistics, upcoming venues, fan base, and past accomplishments. Users can challenge other users to experience the same treks and routes engaging them further. Users may share in a singular point feature for events and can encapsulate the experience of those events using different application programming interfaces (API). Users may find news, weather, and sports spatially and/or compare and overlay maps.

Embodiments may integrate listening to music live and in real-time and integrate spatial integrity, and geofences into a platform that has not been provided by previous implementations. Music may be shared live among users who may be seen on a map so that multiple users listen to the same song at the same time. The capability to listen to celebrities' song selection live may be provided. After a song and/or playlist is heard, users may view a number of followers that may have listened live and in real-time to their song and/or playlist selection. In this embodiment of the present disclosure, a live tracking feature may be enabled and accessible by anyone who may be subscribed to an application. A user location or geolocation may only be visible when the user selects for the location or geolocation to be visible to friends and/or the public.

Systems and methods herein may be used in a variety of scenarios including physical activities (i.e., running, biking), places (i.e., bars, stadiums, clubs), rallies (i.e., political campaigns, artists, and athletes), and local events (i.e., community rallies, neighborhood events, local barbecues). Badges, planners, and challenges may be provided. Badges may be earned through completion of different activities. For example, a user may unlock an achievement by traveling to new places or distinct locations. As the user completes more activities, new badges may be unlocked that be displayed and compared with friends also on the platform.

The platform may be used in a travel mode in embodiments of the present disclosure. This may be considered a linear feature to record a user's activities while he/she is on the move. In other embodiments of the present disclosure, the user may be presented with a list of events from which he/she may select ones of interest.

Sponsorships and event promotions may be incorporated along with an ability to plug into supplemental recreational applications and/or wearables. Systems and methods may be utilized on one or more mobile platforms including Apple IOS, Android and other operating systems. Systems and methods may be implemented via aspects of the Internet.

In embodiments, multiple users may be assimilated into an event such that they are joined into an ongoing event for which they were not the party that established the event. For example, a first user may establish an event as described herein by setting a geopoint or other point around which a geofence is established. In a concert example, the geopoint or central point may be the stage area of a concert and the geofence may be a radius of 200 feet around the stage. The time period may be two hours before the concert begins, the duration of the concert itself, and one hour after the concert ends.

During the time period, users other than the first user who established the event may physically enter the geofence. If those other users have made the appropriate entry into their apps 110a-c executing on their mobile devices 108a-c, they can join or effected be "assimilated" into the event. These assimilated users may then contribute content such as photos, video clips, and audio clips in the same manner as the first user who established the event.

In embodiments, those joining users would be required to make express choices about joining the event. In the interest of respecting user privacy, such users would not be automatically joined to event merely by the action of physically entering a geofence area. Further, even if such users were at the time they entered the geofence currently engaging in a trek, they would not automatically be joined to the event. As noted, such user would need to make an express approval that they be joined to the event.

In an embodiment, a system is provided. The system, that may be the system 100 provided herein, comprises a processor, a memory, and an application that may be the application 104 provided herein. When executed on the processor, the application receives a request to create an event record to store electronic content captured at an event. The application receives geofence area boundary information and scheduling information for the event and creates the event record based on the received information. The event record may be the event record 112a-c provided by the system 100 provided herein.

The application sends messages to at least one mobile device that may be the mobile device 108a-c provided herein, the messages containing an invitation to attend the event and for device users to submit electronic content captured at the event during a time period designated in the event record. The application further stores, in the event record and during the time period, electronic content captured and submitted by the at least one mobile device that received and responded affirmatively to the invitations.

The at least one mobile device must remain within boundaries of the geofence area during the time to submit captured electronic content. The geofence area is defined as a one of venue at which the event takes place, an area within the venue, and the venue plus a defined surrounding area.

The captured electronic content comprises at least one of audio content, still images, and video content.

The geofence area boundary is alternatively created by a mobile device user to record the device user's own experiences within the geofence area during a designated time period. The experiences not be associated with a formal event. This is referred to above as a trek which may be planned or may be created "on the fly" by a mobile device user.

In an embodiment a method is provided comprising a computer, that may be the computer 102 provided by the system 100, creating a trek record describing a trek described in a message received from a first mobile device, the message describing a physical area within which the mobile device is to move during the trek and a time period during which the trek is to take place. The computer creates a geofence for the trek, the geofence based at least on the described physical area. The computer associates the geofence and time period with the record. The computer, upon commencement of the time period, monitors movement of the first mobile device within the geofence area. The computer stores electronic content received from the first mobile device captured while within the geofence area during the time period. The first mobile device may be the mobile device 108a-c provided by the system 100.

The first mobile device describes, in the electronic content, experiences of a user of the first mobile device during the trek. The computer stores the received electronic content on a view page that is viewable and shareable by the user of the first mobile device during and after the designated time period. The computer creates the geofence area to contain a route physically traveled by the user of the first mobile device during the trek. The first mobile device receives a message from a second mobile device, the message containing a challenge regarding the route traveled by the user of the first mobile device during the trek. The second mobile device may be the mobile device 108a-c provided by the system 100. The computer admits the second mobile device to the geofence at a request of the first mobile device to facilitate the challenge.

In an embodiment a method is provided comprising a computer, that may be the computer 102 provided by the system 100, receiving a first message from a first mobile device, the first message containing an instruction for sharing certain electronic content played by the first mobile device while physically within a geofence area specified by the first mobile device. The computer receives a second message from a second mobile device, the second message requesting transmission from the computer of electronic content played by the first mobile device. The computer detects that the first mobile device is physically located within the geofence area. The first and second mobile devices may be the mobile devices 108a-c provided by the system 100.

The computer detects that the first mobile device is playing the certain electronic content. The computer, based on detecting that the first mobile device is physically located in the geofence area and detecting that the first mobile device is playing the certain electronic content, transmits the certain electronic content to the second mobile device.

A user of the first mobile device is not interrupted by the sharing of the electronic content played by the first mobile device with the second mobile device. The computer maintains records on a quantity of mobile devices requesting transmission of electronic content played by the first mobile device and transmits the records to the first mobile device. In addition to quantity, the computer may capture and maintain records about other information associated with mobile devices that have requested transmission of content played by the first mobile device.

The second mobile device displays a map detailing at least a third mobile device presently playing electronic content available for the second mobile device to play. The first, the second, and the at least third mobile devices execute instances of an app enabling request and receipt of predefined electronic content presently playing on other mobile devices during predefined time periods during which the other mobile devices are in geofenced areas. The first, the second, and the at least third mobile devices as well as the other mobile devices may be the mobile devices 108a-c provided by the system 100. The app may be the app 110a-c provided by the system 100.

Although the present disclosure and its advantages have been described in detail, various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system, comprising:
   a processor;
   a memory; and
   an application stored in the memory that when executed on the processor:
     receives a request to create an event record to store electronic content captured at an event,
     receives geofence area boundary information and scheduling information for the event;
     creates the event record based on the received information,
     sends messages to at least one mobile device, the messages containing an invitation to attend the event and submit electronic content captured at the event during a time period designated in the event record; and
     stores in the event record, during the time period, electronic content captured and submitted by the at least one mobile device that received and responded affirmatively to the invitations,
   wherein the geofence area is one of permanent and impermanent, wherein the event is one of formal and informal, wherein the event one of includes invitees and does not include invitees, wherein the event is one of public and private, wherein the event involves assimilation of user-generated content, and wherein the event involves a challenge between users to verifiably complete at least one of a route and an activity within the geofence area.

2. The system of claim 1, wherein the at least one mobile device must remain within boundaries of the geofence area during the time to submit captured electronic content.

3. The system of claim 1, wherein the at least one mobile device executes an app that communicates with the application executing on the processor to transmit captured electronic content to the application for storage in the event record.

4. The system of claim 1, wherein the application executing on the processor publishes portions of the received electronic content for viewing by selected parties.

5. The system of claim 1, wherein the geofence area is defined as a one of venue at which the event takes place, an area within the venue, and the venue plus a surrounding area.

6. The system of claim 1, wherein the captured electronic content comprises at least one of audio content, still images, and video content.

7. The system of claim 1, wherein the geofence area boundary is alternatively created by a mobile device user to record the device user's own experiences within the geofence area during a designated time period, the experiences not associated with a formal event.

* * * * *